March 5, 1940.    L. BRYAN    2,192,484
PIPE COUPLER
Filed Oct. 24, 1938
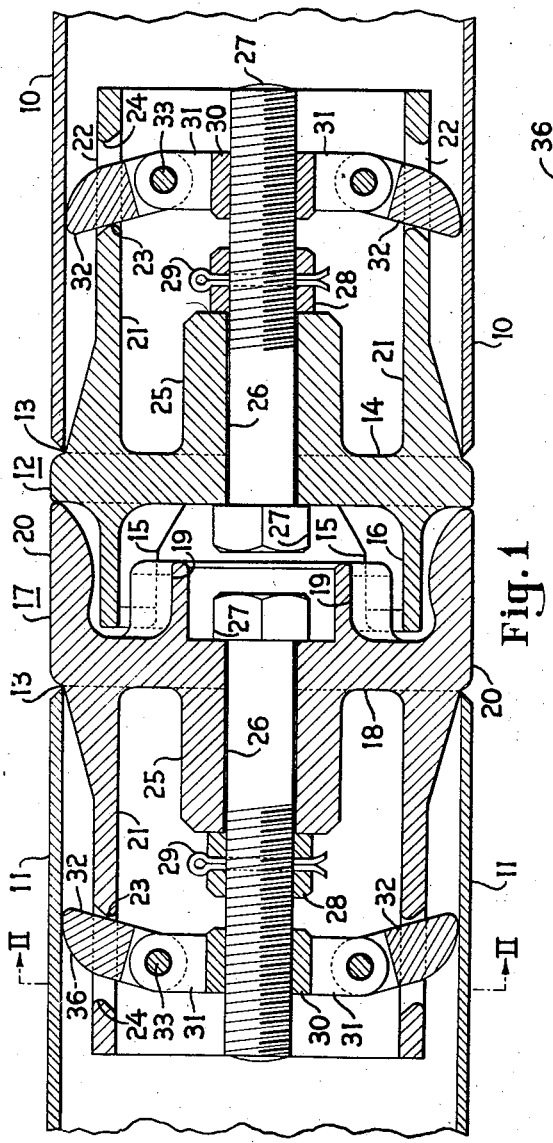
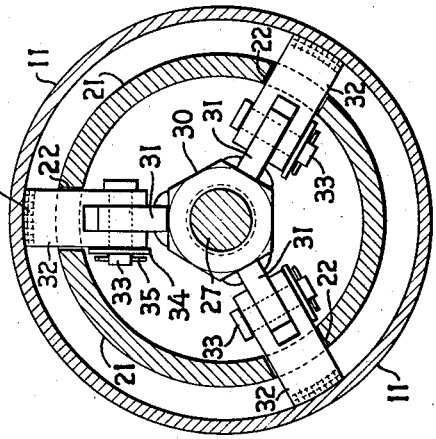
LLOYD BRYAN
INVENTOR Patented Mar. 5, 1940

2,192,484

UNITED STATES PATENT OFFICE 2,192,484

PIPE COUPLER

Lloyd Bryan, Los Angeles, Calif., assignor to Standard Oil Company of California, San Francisco, Calif., a corporation of Delaware Application October 24, 1938, Serial No. 236,740

4 Claims. (Cl. 285—1)

This invention relates to a pipe coupler, and particularly one for temporarily securing together successive lengths of pipe as they are passed through a machine for applying a coating to their outer surface. These machines operate continuously and usually require the pipe to be given a helical motion in which the pipe is longitudinally advanced and rotated at the same time. The present invention is an improvement over the coupler described and claimed in United States Patent No. 2,077,769, issued April 20, 1937, to W. R. Postlewaite, and assigned to the common assignee herewith.

Heretofore couplers of this type have been provided with radially extensible set screws or dogs, which were expanded outwardly to engage the inner surface of the pipe to be coupled. In order to actuate the screw type of pipe-engaging means, such as that of the Postlewaite Patent No. 2,077,769, it was necessary to reach inside the coupler with a ratchet wrench. This required that the pipe be stationary, which materially intefered with the rapid operation of the coating procedure. The radially extensible dog type, which is illustrated by United States Patent No. 1,869,780 to L. S. Rosener, dated October 2, 1932, was ordinarily provided with wedges which had a sliding engagement with the dog to move it inwardly or outwardly with respect to the body of the coupler.

This invention comprehends broadly the provision of hinged or swinging dogs which are actuated from the end of the coupler and moved outwardly to engage the pipe or inwardly to release the coupler therefrom.

It is an object of this invention to provide a pipe-coupling apparatus of this nature which may be easily and positively aligned when used with reclaimed or crooked pipe and which may be rapidly and positively engaged and disengaged from the pipe in which it is placed.

Another object is to provide a pipe-engaging means for a body, such as the parts of a separable coupler, which will be positive in its action and will not be affected by dirt or grit which may cover the relatively moving parts.

These and other objects and advantages of this invention will be more fully apparent from the following description and from the accompanying drawing, which forms a part of this specification and illustrates a preferred embodiment of this device.

In the drawing,

Fig. 1 is a longitudinal sectional view of a separable pipe coupler with securing means in position to retain the parts of the coupler in place in two sections of pipe which are to be temporarily joined.

Fig. 2 is a transverse sectional view on line II—II of Fig. 1.

Broadly, the coupler to which this invention is particularly adapted comprises a pair of cooperating elements or members each designed to be inserted into the adjacent ends of the pipe sections to be joined. Preferably, aligning means are provided to guide one part of the coupler into proper relation to its mate so that a separate complementary torque transmitting means will engage smoothly and properly and so that the two pipe sections will be truly aligned during engagement. Means may be provided in the coupler structure to cause the leading or foremost pipe section to advance or carry forward the trailing section, as in United States Patent No. 1,948,956 issued February 27, 1934, to D. W. Boylan, or some other means independent of the coupler may be utilized to cause the trailing section to be urged forwardly against the one preceding it through the pipe feeding or coating mechanism. An example of such means is shown in the co-pending patent application of William R. Postlewaite, Ser. No. 148,245, which issued July 18, 1939, as Patent No. 2,166,608.

In this example, which illustrates a preferred environment for this subject invention, but which does not limit its application to other structures, reference numeral 10 indicates the leading section of pipe and reference numeral 11 designates the trailing section. A generally cylindrical member 12 is adapted to be inserted into pipe 10 and to be aligned therein by a shoulder 13 which engages the end of the pipe. Member 12 includes a disc portion 14 from the outer face of which project a plurality of circumferentially spaced lugs 15 extending radially inwardly from a ring 16. The trailing member 17 of the coupler likewise comprises a disc portion 18 and is provided with outwardly extending lugs 19 which are adapted to mate with lugs 15 of the leading to transmit torque from one part of the coupler to the other.

In this example the two parts of the coupler are preferably aligned by a ring portion 20 on member 17 into which ring 16 and lugs 15 of member 12 are adapted to project, as shown in Fig. 1.

Referring to member 12, which may be the leading member of the coupler, a fixed guide means, which may be in the form of a cylindrical sleeve 21, extends inwardly from disc 14 to project into pipe 10. Near the inner end of sleeve 21 are circumferentially spaced apertures 22, which are preferably shaped at 23 and 24 to provide inner and outer fulcrum points for the pipe-engaging means which will be described below.

In the center of disc 14, a boss 25 projects inwardly and is bored as at 26 to receive a threaded bolt 27, the head of which engages the outer face of disc 14, the threaded end extending inwardly through boss 25 and into sleeve 21. In order to prevent bolt 27 from moving longitudinally in member 12, a nut 28 is threaded onto the bolt and is secured thereto by means such as a cotter key 29. This permits bolt 27 to be rotated, but prevents undesired longitudinal motion.

Near the inner end of bolt 27 is a second nut 30 from which lugs 31 project radially outward and are circumferentially spaced to correspond with apertures 22 in sleeve 21. Each lug 31 on nut 30 is provided with an outwardly extending dog 32 pivotally connected to the lug by means of a pin 33 secured by washer 34 and cotter key 35. Dogs 32 project outwardly through apertures 22 and, when they are in their expanded position, as shown in Fig. 1, will engage the inner surface of pipe 10 at a plurality of points, as shown in Fig. 2. This is accomplished by rotating bolt 27 to move nut 30 inwardly toward boss 25, thus causing dog 32 to engage the inner fulcrum points 23 of aperture 22 in sleeve 21. The amount of force exerted by dogs 32 against the inner face of pipe 10 will be determined by the pitch of the thread on bolt 27 and the position of the fulcrum point 23 with respect to the pivot pin 33 on lugs 31, according to well-known mathematical relations. It is desirable to shape the outer face of dogs 32 to conform to the inner circumference of pipe 10, and it is also desirable to roughen or knurl them as at 36.

To retract the securing means holding member 12 to pipe 10, bolt 27 is rotated to move nut 30 away from boss 25, which will engage dogs 32 with the outer fulcrum points 24, causing them to swing inwardly on pins 33 and permitting member 12 to be removed from pipe 10. It will be appreciated that the sides of apertures 22 will engage dogs 32 and prevent nut 30 from rotating when bolt 27 is rotated.

Referring to Fig. 1, it will be noted that the trailing member 17 of the coupler is likewise provided with means for securing it to the pipe which are identical in all points to those just described for member 12. Repetition of a description of these means is obviously unnecessary.

It will be appreciated that the improved means for securing the two parts of the coupler of this example into their adjacent pipe sections could equally well be applied to any other form of coupler or member which is to be fastened into a length of pipe and subsequently removed therefrom. The essential features of the invention appear to reside in the provision of a plurality of dogs or swinging members hinged to a longitudinally movable part, which dogs cooperate with fixed guide means adapted to provide fulcrum points to expand or contract the dogs, depending upon the direction of longitudinal motion of the movable part. Although a specific construction embodying this invention has been described and illustrated, it is to be understood that the invention is not limited to that specific device, and all such modifications and changes that come within the scope of the appended claims are embraced thereby.

I claim:

1. In a coupling for temporarily securing together two sections of pipe, a member adapted to be loosely inserted into one of the pipes to be joined, an axial screw rotatably mounted in said member, means for preventing longitudinal motion of said screw in said member, a nut for said screw, a plurality of dogs hinged to said nut and extending outwardly therefrom, and an apertured sleeve on said member, said dogs projecting therethrough and adapted to be expanded or contracted by contact with said sleeve when said screw is rotated.

2. A coupling according to claim 1 in which the apertures in said sleeve form fulcrums for expanding and contracting said dogs and for preventing rotation of said nut.

3. A body adapted to be secured within a cylindrical bore, comprising means on said body movable longitudinally with respect to the axis of said bore, a plurality of members hinged to said last-named means and extending radially therefrom, and fixed guide means on said body comprising inner and outer fulcrum points for engaging said hinged members to expand or contract the same when said longitudinally movable means is moved with respect to said body.

4. A body adapted to be secured within a cylindrical bore, comprising means on said body movable longitudinally with respect to the axis of said bore, a plurality of members hinged to said last-named means and extending radially therefrom, and apertured guide means fixed to said body so constructed and arranged that each of said hinged members projects outwardly through one of said apertures, the longitudinally spaced sides of said apertures forming inner and outer fulcrum points for expanding and contracting said hinged members and the circumferentially spaced sides of said apertures forming a guide for said longitudinally movable means.

LLOYD BRYAN.